Jan. 28, 1969   R. D. McINTYRE ET AL   3,424,494
SEAT BELT POSITIONING MECHANISM
Filed Sept. 5, 1967   Sheet 1 of 2
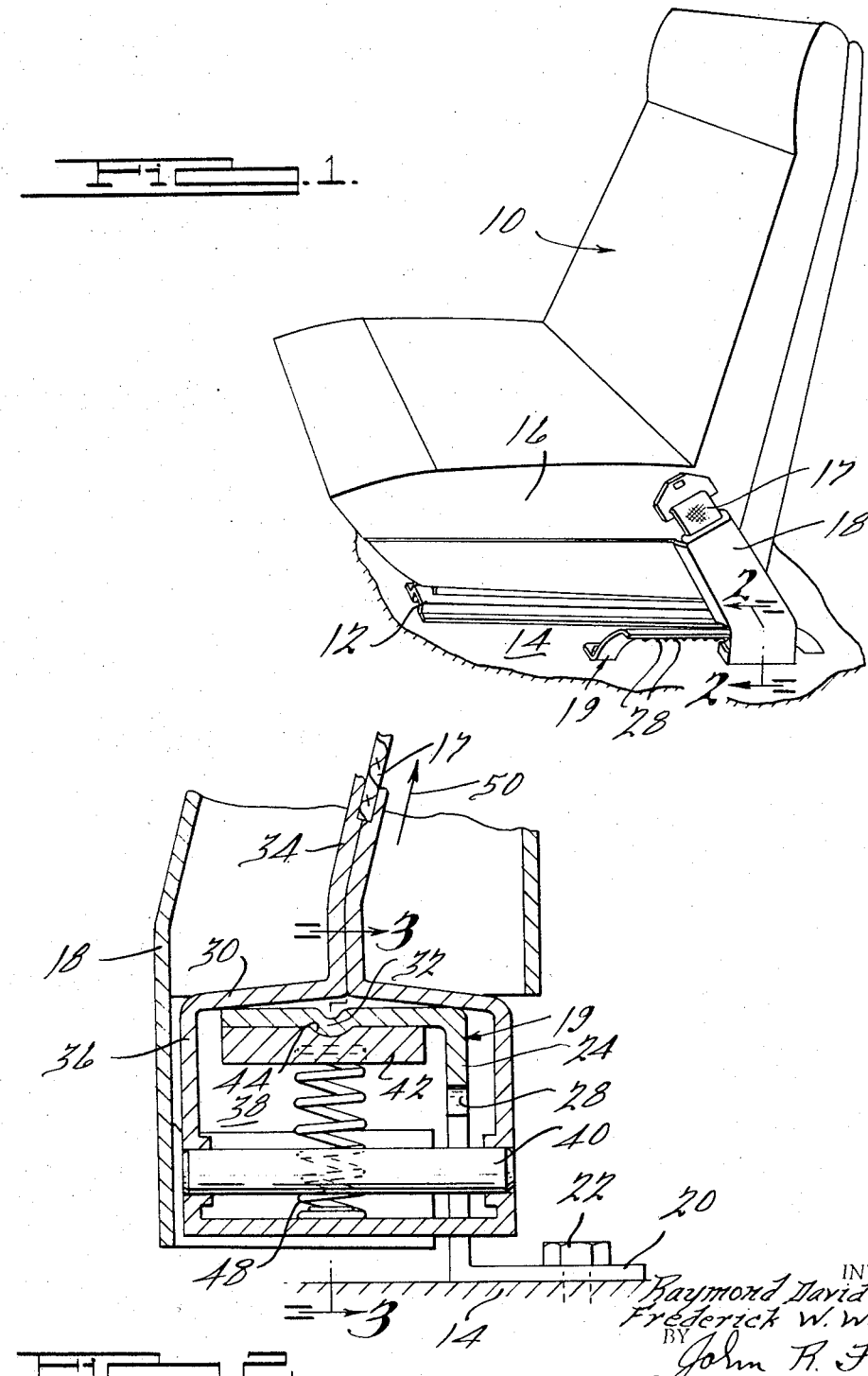

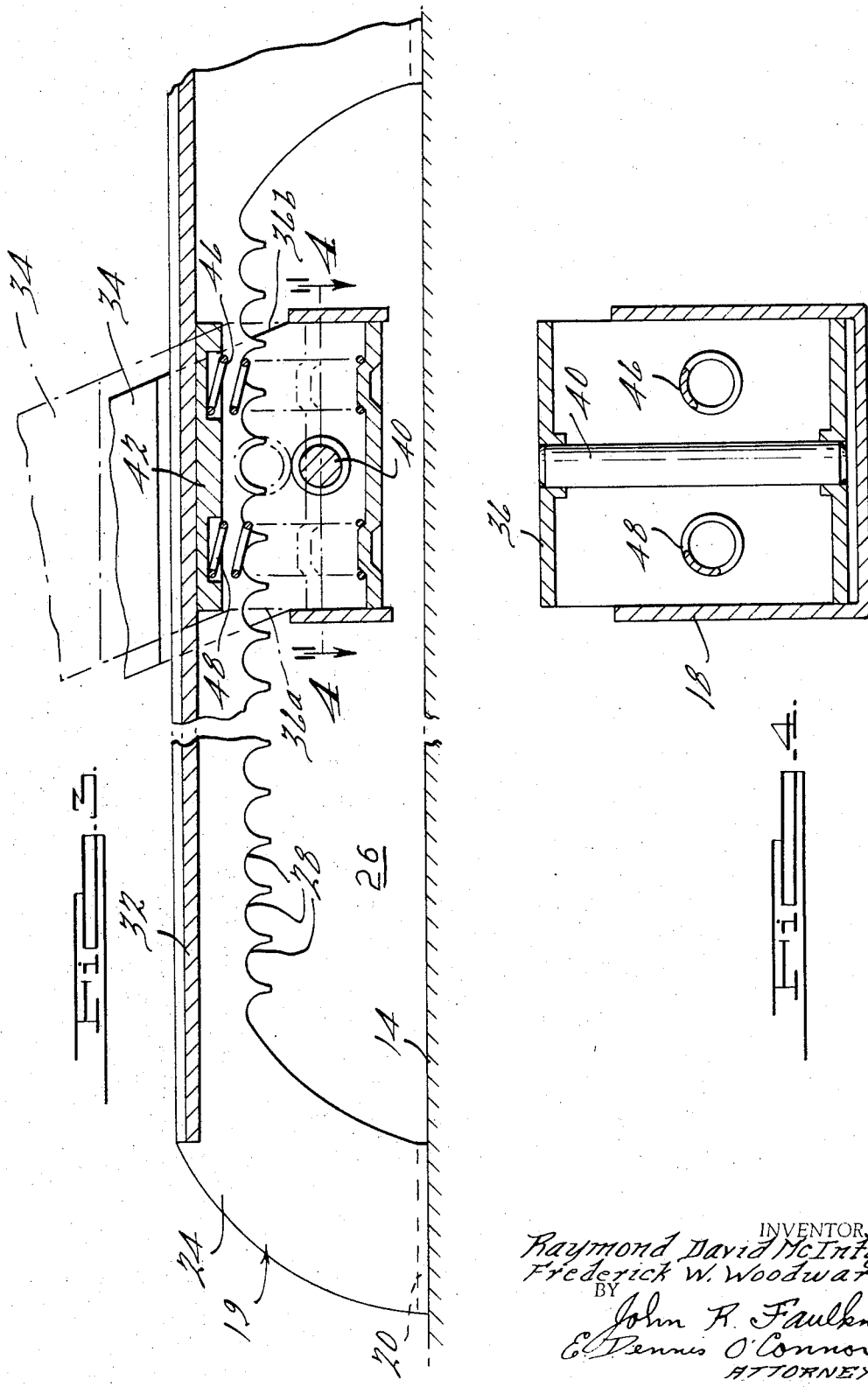

United States Patent Office 3,424,494
Patented Jan. 28, 1969

3,424,494
SEAT BELT POSITIONING MECHANISM
Raymond David McIntyre and Frederick W. Woodward, Livonia, Mich., assignors to Ford Motor Company, Dearborn, Mich., a corporation of Delaware
Filed Sept. 5, 1967, Ser. No. 665,577
U.S. Cl. 297—385   8 Claims
Int. Cl. B60r 21/10; A47f 5/00

ABSTRACT OF THE DISCLOSURE

A positioning mechanism for a motor vehicle seat belt segment that allows movement of the effective anchoring point of the seat belt segment to the vehicle body structure to accommodate variances in the horizontal positioning of an adjustable passenger seat. The seat belt segment anchoring point is locked automatically against movement when the belt is drawn taut to secure a passenger seat occupant and is unlocked automatically when no external force urging the seat belt segment into a taut position is applied.

Background of the invention

It is recognized in the art that a motor vehicle seat belt segment having one of its ends immovably anchored to vehicle body structure such as the floor panel of the vehicle passenger compartment does not provide optimum seat belt positioning for all adjustment positions of a vehicle passenger seat. This especially is true of vehicles wherein a passenger seat is capable of relatively large horizontal adjustments to accommodate variances in the dimensions of the set occupant and riding position preferences. Attempts have been made to provide optimum seat belt segment positioning by securing one end of a seat belt segment to the structure of the passenger seat for movement therewith rather than immovably securing the end of the seat belt segment to the passenger compartment floor. Many vehicle passenger seat structures are not designed, however, with requisite strength characteristics to provide adequate support for a seat belt segment anchored directly thereto so that sufficient restraint of a belted seat occupant can be obtained during vehicle crash conditions. Redesigning passenger seat structures to provide the requisite strength characteristics does not appear to be a solution to this problem since these strength characteristics could be obtained only by making the seat structures relatively massive, and deleteriously affecting manufacturing and assembly cost considerations.

It is an object of this invention to provide a seat belt segment positioning mechanism that allows a seat belt segment to be operatively secured to the motor vehicle passenger compartment floor panel. The anchoring point, however, is movable when the seat belt segment is inoperative. Furthermore, this mechanism provides that upon a force being applied to the seat belt segment urging said segment into a taut condition, such as when the seat belt segment is operative to restrain a passenger seat occupant against movement, that the seat belt segment anchoring point will be locked against movement. Upon the termination of the above-mentioned taut condition, the mechanism of this invention automatically provides that the seat belt segment anchoring point be unlocked, permitting movement in response to variances in the horizontal adjustment of the passenger seat.

Summary of the invention

A seat belt positioning mechanism constructed in accordance with this invention is adapted for utilization in a motor vehicle having a passenger compartment floor member and a passenger seat slidably mounted to said member for movement relative thereto. Elongate seat belt locating means are secured to the floor member proximate the seat. A seat belt segment having one of its ends operatively secured to the locating means for movement along the length of the latter is operatively secured to engaging means. The engaging means are capable of cooperating with the locating means to securely position the seat belt sement in one of a plurality of positions along the length of the locating means. Resilient means yieldably urge the engaging means out of engagement with the locating means to permit sliding movement of the seat belt segment along the locating means when no external force is applied to the seat belt segment urging this segment into a taut condition.

Description of the drawing

FIGURE 1 is an isometric view of a portion of a motor vehicle passenger compartment illustrating a horizontally adjustable passenger seat and including a seat belt positioning mechanism constructed in accordance with this invention;

FIGURE 2 is a partial sectional view taken along the line 2—2 of FIGURE 1;

FIGURE 3 is a sectional view taken along the line 3—3 of FIGURE 2; and

FIGURE 4 is a sectional view taken along the line 4—4 of FIGURE 3.

Detailed description of the invention

Referring now in detail to the drawings and in particular FIGURE 1, the numeral 10 denotes generally the structure of a motor vehicle passenger seat that is slidably mounted to a track 12 that, in turn, is secured to the floor panel 14 of a motor vehicle passenger compartment. The mounting of seat 10 on track 12 allows fore and aft horizontal adjustment of seat 10 as indicated by the arrow 16.

A conventional seat belt segment 17 is arranged proximate to seat 10 and is partially surrounded by a conventional resilient boot 18. It is to be understood that although only one seat belt segment is illustrated in FIGURE 1, segment 17 cooperates with a second seat belt segment positioned on the opposite side of seat 10 to form a composite seat belt capable of restraining a vehicle passenger seat seated at seat 10. Also, it is to be understood that a conventional seat belt retracting reel may be mounted along the length of seat belt segment 17 within boot 18. Seat belt segment 17 is operatively secured to a seat belt mounting bracket 19 that will be discussed in detail below.

Referring now to FIGURES 2, 3 and 4 of the drawings, it may be observed that seat belt mounting bracket 19 includes a horizontal lower flange 20 that is secured to passenger compartment floor panel 14 by a plurality of fasteners 22 (one shown). Extending from lower horizontal flange 20 of bracket 19 is an integrally formed vertical portion 24, the major portion of which is cut-away to form an opening 26. Along the upper surface of opening 26 are plurality of downward facing concave recesses 28, extending along a substantial portion of the length of the bracket 19. Integrally connected to and extending from upright portion 24 of bracket 19 is an upper horizontal flange 30 having a convex projection 32 extending from the bottom surface thereof along the length of flange 30.

As most clearly shown in FIGURE 2, one end of seat belt segment 17 is secured to an upwardly extending projection 34 of a housing 36. The housing 36 is a generally rectangular box having end wall openings 36a and 36b (FIG. 3), that allow it to be assembled with bracket 19 to loosely surround said bracket. A central chamber 38 is defined by housing 36 and has extending therethrough a pin 40 that is secured in the side walls of housing 36. Within chamber 38 is located a follower block 42, the top surface of which has formed therein a concave recess 44 having dimensions such that it receives concave rejection 32 of bracket flange 30. A pair of compression springs 46 and 44 extend vertically through central chamber 38. One end of each of said springs is secured to follower block 42 while the other end of said springs bears against the internal surface of the bottom wall of housing 36.

When seat belt segment 17 is in the inoperative position illustrated in FIGURE 1, it readily may be appreciated that no external forces are being applied to belt segment 17 tending to cause the belt segment to assume a taut position. Since springs 46 and 48 are bearing upon the bottom surface of housing 36 and follower block 42 that bears upon horizontal flange 30 of bracket 19; the force exerted by these two springs urges housing 36 into the position illustrated in FIGURE 2 wherein pin 40 is located remote from recesses 28. Since housing 36 loosely surrounds bracket 19 as illustrated and is capable of sliding movement along the length of cutaway portion 26 of bracket 19, housing 36, belt segment 17 and boot 18 are capable of longitudinal movement fore and aft along the side of passenger seat 10. In this manner an optimum positioning of belt segment 17 is obtained for various horizontal adjustments of seat 10.

When it is desired by an occupant of seat 10 to utilize belt segment 17 in cooperation with another belt element anchored on the opposite side of seat 10 to secure said passenger during operation of the motor vehicle, belt segment 17 is fully withdrawn from boot 18 and securely fastened in a taut condition about the body of the occupant of seat 10. With belt segment 17 in a taut, operative condition, a force is exerted along the length of belt segment 17 tending to urge housing 36 upwardly against the force exerted by springs 46 and 48. The force exerted along the length of belt segment 17 is illustrated by the arrow 50 (FIGURE 2).

As belt 36 moves upwardly, pin 40 is received by one of the plurality of recesses 28 formed in upright portion 24 of bracket 19. The engagement between pin 40 and one of the recesses 28 precludes horizontal movement of housing 36 and belt segment 17 along the length of bracket 19. Recesses 28 and pin 40 thus comprise cooperating positioning and engaging means that secure the anchoring point of belt segment 17 when said segment is in an operative position.

Upon belt segment 17 being disengaged with a cooperating belt element and its return to the slack position illustrated in FIGURE 1, springs 46 and 48 cause the return of housing 36 into the position of FIGURE 2 and the disengagement of pin 40 and a recess 28. At this time, the effective anchoring point of seat belt segment 17 is capable of adjustment in response to an adjustment of the horizontal position of seat 10 so that an optimum seat belt position relative to the passenger seated in seat 10 may be achieved.

It may thus be seen that this invention provides a mechanism whereby a seat belt segment effective anchoring point may be adjusted in response to an adjustment of the vehicle seat associated therewith. This anchoring point is secured against movement, however, when the seat belt segment is in use to restrain a passenger in the vehicle seat and is automatically returned to a condition wherein further adjustment is possible upon the termination of use of said segment.

It is to be understood that this invention is not limited to the exact construction shown and described above or the abstract preceding this specification, but that various changes and modifications may be made without departing from the spirit and scope of the invention as defined by the following claims.

We claim:
1. In a motor vehicle having a passenger compartment floor member and a passenger seat slidably mounted to said member for movement relative thereto, elongate seat belt locating means secured to said member proximate said seat, a seat belt segment, engaging means operatively secured to said seat belt segment at one end of the latter for movement therewith and adapted to engage said locating means to securely position said seat belt segment in one of a plurality of positions along the length of said locating means, and resilient means yieldably urging said engaging means out of engagement with said locating means and permitting sliding movement of said seat belt segment along said locating means when no external force is applied to said seat belt segment.

2. The combination of claim 1, wherein said locating means comprises a bracket having a plurality of recesses formed therein and said engaging means comprises a pin receivable in one of said recesses when said seat belt segment is urged into a taut condition.

3. The combination of claim 2, wherein said one seat belt segment end is secured to a housing loosely surrounding said bracket, said pin mounted in said housing.

4. The combination of claim 3, wherein said resilient means comprises a compression spring located within said housing and operatively bearing on said housing and said bracket.

5. A seat belt segment locating assembly positioned adjacent to a passenger seat mounted to body structure of a motor vehicle, said assembly including elongate seat belt mounting means secured to said body structure, a seat belt segment having one end thereof operatively secured to said mounting means for movement along the length of the latter and having a taut operative condition when securing a passenger in said seat, engageable locking means on said mounting means and capable of operatively securing said seat belt segment against movement relative to said mounting means in one of a plurality of positions when said seat belt segment is in the operative condition, and resilient means exerting a force on said locking means automatically disengaging said locking means when said seat belt segment is not in the operative condition.

6. The seat belt segment locating assembly of claim 5, wherein said engageable locking means includes a plurality of recesses on said mounting means and a pin operatively secured to said one seat belt segment end and receivable in any one of said recesses.

7. The seat belt segment locating assembly of claim 5, wherein said one seat belt segment end is secured to a housing, said housing loosely surrounding said mounting means for movement along the length of the latter, said engageable locking means including a pin secured in said housing and receivable in any one of a plurality of recesses formed in said mounting means.

8. The seat belt segment locating assembly of claim 7, wherein said resilient means comprises a compression spring, said mounting means having a track extending along the length thereof, a track follower positioned within said housing, one end of said spring secured to said track follower; the other end of said spring bearing on said housing.

References Cited

UNITED STATES PATENTS

| | | | |
|---|---|---|---|
| 1,942,998 | 1/1934 | Browne | 248—393 |
| 3,186,760 | 1/1965 | Lohr et al. | 297—385 X |
| 3,204,916 | 9/1965 | Pickels | 248—385 X |
| 3,207,554 | 9/1965 | Dall | 297—385 |
| 3,362,748 | 1/1968 | Carter | 297—385 |
| 3,377,102 | 4/1968 | Henrickson | 297—385 |

JAMES T. McCALL, *Primary Examiner.*

U.S. Cl. X.R.

248—293